Feb. 10, 1953  J. E. JONES  2,628,336
VARIABLE VOLTAGE MOTOR CONTROL SYSTEM
Filed April 17, 1952
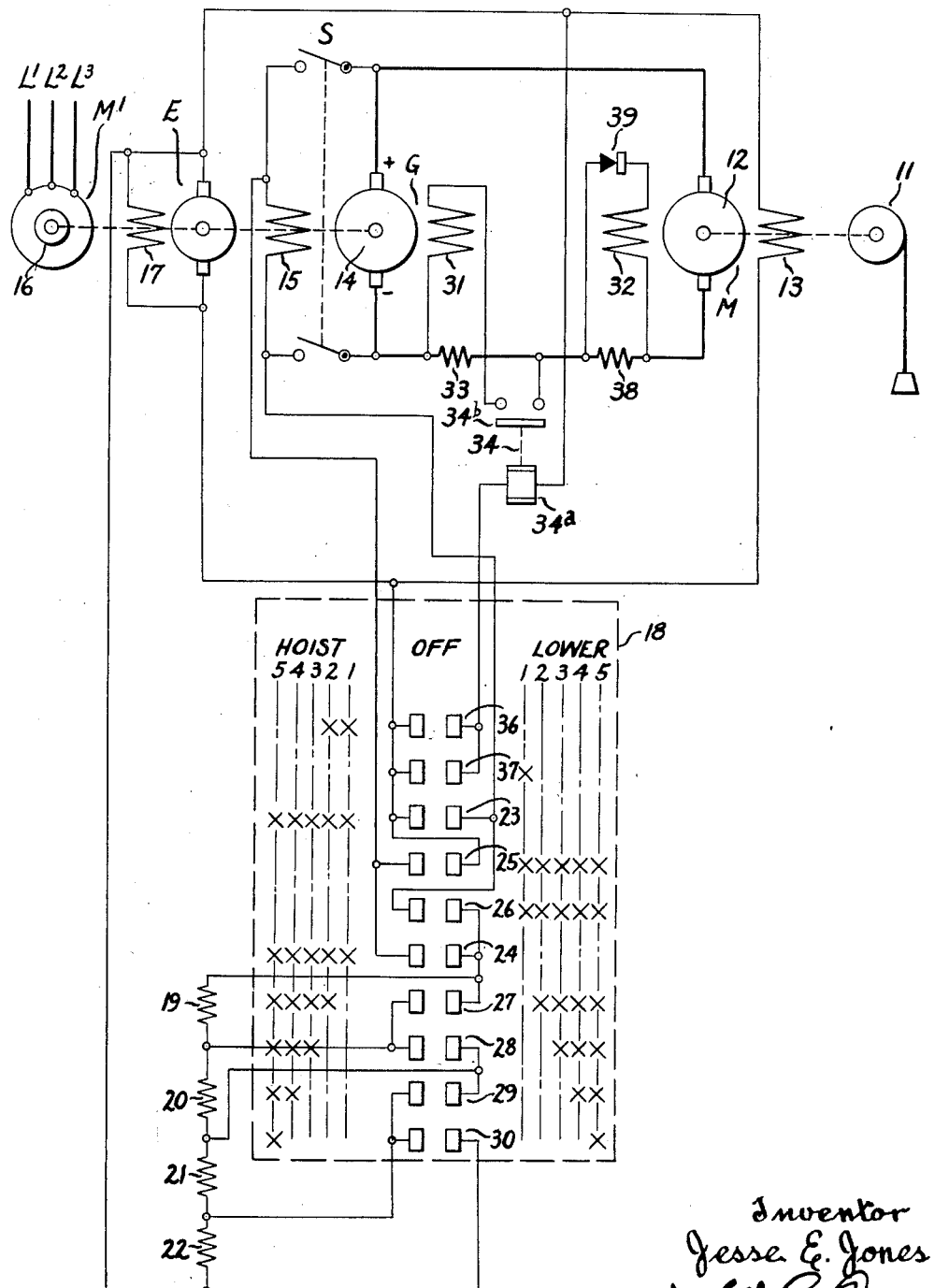
Inventor
Jesse E. Jones
By W. C. Lyon
Attorney Patented Feb. 10, 1953

2,628,336

UNITED STATES PATENT OFFICE 2,628,336

VARIABLE VOLTAGE MOTOR CONTROL SYSTEM

Jesse E. Jones, Wauwatosa, Wis., assignor to Cutler-Hammer, Inc., Milwaukee, Wis., a corporation of Delaware Application April 17, 1952, Serial No. 282,736

7 Claims. (Cl. 318—144)

This invention relates generally to variable voltage motor control systems and more particularly to an improved variable voltage motor control system particularly suitable for use with hoists.

In U. S. Patent No. 2,441,271 which issued to Oliver P. Proudfoot and myself on May 11, 1948, there is shown and described a variable voltage motor control system, particularly adapted for use with a hoist. In order to obtain the desired speed torque characteristics the system therein disclosed employs an auxiliary series field for each hoist motor and generator, such auxiliary series fields being included or excluded from circuit by electromagnetic contactors as required by the operating circumstances. The generator auxiliary series field winding is energized only on the low speed operating points of said system in order to provide a small amount of generator compounding for bolstering the generator voltage at low shunt field excitation. Thus by simply providing for the closure of a switch on the first and second points hoisting and the first point lowering, energization of the generator auxiliary series field winding is controlled for all conditions of operation. However, energization of the motor auxiliary series field winding cannot be satisfactorily accomplished by speed point selection alone because in the lowering quadrants the energization of the latter winding is dependent upon whether the load is non-overhauling or overhauling. Accordingly, the motor control system disclosed in the above patent includes a load relay subjected to the current in the armature loop circuit, which relay is adapted to effect energization of a switch to afford disconnection from circuit of the motor auxiliary series field winding on all points lowering, except when the motor is subjected to an overhauling load, in which latter case the load relay drops out to permit closure of the last mentioned swtich and afford consequent reconnection of the motor auxiliary series field winding in circuit. Although this system of controlling the energization of motor auxiliary series field winding was considered to be satisfactory, it was nevertheless subject to the same difficulties usually attendant the use of current sensitive relays and their associated switches, and was further objectionable in that it required electromagnetic switches while the trend was toward the use of the more compact and cheaper manual equipment.

It therefore is an object of this invention to provide an improved variable voltage motor control system which does not require the use of a current sensitive relay and electromagnetic switch to control the motor auxiliary series field winding.

Another object of this invention is to simplify and to further reduce the amount of control equipment necessary for the subject variable voltage control system.

Another object of this invention is to provide a variable voltage control system which is more economical to manufacture and which more readily lends itself to use with non-magnetic controllers.

Other objects and advantages will hereinafter appear.

An embodiment of the invention is shown in the accompanying drawing which will now be described, it being understood that the embodiment illustrated is susceptible of various modifications without departing from the scope of the appended claims.

In the drawing, the single figure is a circuit diagram of my improved control system. The hoist drum of a crane or other similar equipment is schematically represented at 11, and is connected for driving by a direct current motor M having an armature 12 and a separately excited shunt field winding 13. The motor armature 12 is connected in a loop circuit with the armature 14 of a direct current generator G which provides a variable armature voltage for said motor. Said generator is also provided with a separately excited shunt field winding 15 which may be connected across the generator armature by means of switch S when the equipment is at standstill. This reduces the circulating current in the closed armature loop circuit to a low value. The S switch contacts place the generator field and armature in reversed polarity with respect to each other; thus any generator residual voltage is bucked out by its own shunt field. Although for purposes of simplicity switch S is illustrated as a manually actuated switch, in practice it preferably would be of the electromagnetic type with normally closed contacts which are held open whenever a master controller is placed in the "hoist" or "lower" positions. The armature 16 of alternating current motor M¹ which is supplied with polyphase alternating current from supply lines L¹, L² and L³ is operably connected to generator G for driving the latter at a substantially constant speed. Constant voltage direct current for the shunt fields 13 and 15 is provided by means of an exciter E which is also driven by means of alternating current motor M¹ and has a shunt field winding 17.

As previously mentioned, shunt field windings 13 and 15 are both supplied by the exciter E. However, for effecting control of the hoist motor, the generator shunt field winding may have its polarity reversed and its energization varied by means of a drum controller 18 and the series connected resistors 19, 20, 21 and 22. Controller 18 is provided with contact pairs 23 and 24, which are closed in all hoisting positions to provide appropriate polarity for generator shunt field winding 15. Contact pairs 25 and 26 of controller 18 are closed in all lowering positions and provide reversed polarity for winding 15 in all lowering positions. Controller 18 is also provided with contact pairs 27, 28, 29 and 30 which are progressively closed as the controller is moved from the off position to the various operating positions in the hoisting and lowering direction to shunt out the resistors 19, 20, 21 and 22 and thereby vary the energization of the generator shunt field winding 15.

The generator G and hoist motor M are also provided with auxiliary series field windings 31 and 32, respectively. Auxiliary field winding 31 is connected across a voltage drop resistor 33 in the generator-motor armature loop circuit, and is connected and disconnected from circuit by means of a contactor 34 having an energizing winding 34ª and normally open contacts 34ᵇ. Winding 34ª is afforded energization in the first and second point hoisting positions through closure of contact pairs 36 of controller 18, and is also energized in the first point lowering position through closure of contact pairs 37 of controller 18. Generator auxiliary field winding 31 is thus connected across resistor 33 in first and second points hoisting positions and also in first point lowering position.

On the first and second points hoisting generator auxiliary series field winding is used accumulatively with its shunt field to reduce the slope of the speed-torque curves for those points. This permits positive hoisting on the first points with full load without sacrificing a slow slack cable takeup and light line hoisting speed. On the first point lowering the generator auxiliary series field is used accumulatively with its shunt field for power lowering and differentially for regenerative lowering to provide a constant lowering speed under all conditions of lowering. The generator auxiliary series field winding is excluded from circuit on all other operating points and the machine operates as a straight shunt generator, with the voltage output being controlled by adjusting the field strength of the shunt field by means of shunting the resistors 19 through 22 into and out of circuit with winding 15.

The motor auxiliary series field 32 is also connected across a voltage drop resistor 38 in the generator-motor armature loop circuit. However, I have found that it is not necessary to insert and disconnect the motor auxiliary series field winding from circuit by means of contactors and relays or the like, and that much better control of said field is obtained by connecting it across the voltage drop resistor 38 in series with a blocking rectifier 39 which is preferably of the dry plate type because of their relatively long life and reliability. Thus, with the rectifier 39 connected as shown in the drawing and the controller moved in the hoisting direction, the motor auxiliary series field is in circuit on all speed points and acts accumulatively with the shunt field 13 to produce speed characteristics substantially identical to those in the hoisting quadrant of the graph shown in Fig. 3 of the previously mentioned Patent No. 2,441,271. However, in power lowering, with the reversal of the generator shunt field 15 and the consequent reversal of polarity and current flow in the power loop circuit, the blocking rectifier 39 prevents energization of the motor auxiliary series field winding 32. Thus as long as the hoist is lowering a light load, the motor auxiliary series field will be effectively excluded from circuit and permit a high light line lowering speed. However, if the load is such as to cause the hoist motor M to regenerate, the loop current reverses and the blocking rectifier allows current to flow in the auxiliary series field winding 32 accumulatively with the motor shunt field 13 and proportionately to the amount of current regeneration. This increases the regenerative voltage and results in a speed torque characteristic whereby a heavy load is lowered at a slower speed than a light load for a given speed point setting of the controller in the regenerative quadrant of machine operation. The machine performance is, therefore, substantially the same for both the hoisting and lowering operations.

Although for ease of description I have shown and described my improved adjustable voltage control system in only its essentials, it is to be understood that it would in practice include the control devices and other protective and refining features usually found in such systems of motor control. These will readily appear to anyone skilled in the art.

What I claim as new and desire to secure by Letters Patent is:

1. In a variable voltage system for hoists, a generator, a compound motor supplied thereby and having a series field winding, means to effect reverse operations of said motor by reversing the polarity of a field winding of said generator and to vary the excitation of said generator to provide for said motor a plurality of hoist and lowering speed points, and means associated with the former means including a rectifier to effect inclusion of said motor series field winding on all lowering points under overhauling load conditions and to exclude said motor series field winding from circuit under power lowering conditions.

2. In a variable voltage system for hoists, in combination, a generator, a compound motor supplied thereby and having an auxiliary series field winding, means to effect reverse operations of said motor by reversing the polarity of a field winding of said generator and to vary the excitation of said generator to provide for said motor a plurality of hoist and lowering speed points, and rectifier means connected in series with said motor auxiliary field winding for effecting inclusion of said latter winding on all lowering points under overhauling conditions.

3. In a variable voltage system for hoists, in combination, a generator, a compound motor supplied thereby and having an auxiliary series field winding, control means for said generator for effecting reverse operation of said motor and providing a plurality of speed points therefor, and rectifier means connected in series with said auxiliary series field winding for permitting energization thereof under certain conditions of hoist operation and blocking energization thereof under certain other conditions.

4. In a variable voltage system for hoists, in combination, a generator, a compound motor connected in a loop circuit therewith and having an auxiliary field winding connected in parallel with a voltage drop resistor in said loop circuit, control means for said generator for varying the loop circuit voltage and for reversing the polarity thereof, and a blocking rectifier connected in series with said motor auxiliary winding to prevent energization thereof during light line lowering conditions.

5. In a variable voltage system for hoists, in combination, a generator, a compound motor connected in a loop circuit therewith and having an auxiliary field winding, a voltage drop resistor in said loop circuit with said auxiliary field winding connected in parallel therewith, control means for said generator to effect reversal of the voltage polarity in said loop circuit and consequent reversal of said motor and for varying the excitation of said generator to provide for said motor a plurality of hoist and lowering speed points, and a blocking rectifier, said rectifier being connected in series with said auxiliary field winding to prevent energization thereof when said motor is driven in the lowering direction by said generator.

6. In a variable voltage control system for hoists, in combination, a generator, a compound motor supplied thereby and having an auxiliary series field winding to be excluded from circuit under certain conditions, means to effect reverse operations of said motor by reversing the polarity of a field winding of said generator and to vary the excitation of said generator to provide for said motor a plurality of hoist and lowering speed points, and means responsive to direction of load current through the armature of said motor to disconnect said auxiliary series field winding from circuit for power lowering, said last mentioned means comprising a rectifier connected in series with said auxiliary field winding.

7. In a variable voltage control system for hoists, in combination, a direct current motor, said motor having an auxiliary field winding, a voltage drop resistor connected in parallel with said winding and in series with the power circuit of said motor, and a blocking rectifier connected in series with said auxiliary winding whereby the energization of said winding is made dependent upon the direction of current flow through said motor.

JESSE E. JONES.

No references cited.